H. C. MILLER.
Carriage-Wrench.

No. 218,046. Patented July 29, 1879.

Attest:
F. C. Mosher
Conrad Dechert

Inventor.
Henry C. Miller

UNITED STATES PATENT OFFICE.

HENRY C. MILLER, OF BLUE MOUND, ILLINOIS, ASSIGNOR OF ONE-HALF HIS RIGHT TO JASPER B. MILLER, OF SAME PLACE.

IMPROVEMENT IN CARRIAGE-WRENCHES.

Specification forming part of Letters Patent No. 218,046, dated July 29, 1879; application filed March 27, 1879.

*To all whom it may concern:*

Be it known that I, HENRY C. MILLER, of the State of Illinois, in the county of Macon and town of Blue Mound, have invented a new and useful Improvement in Carriage-Wrenches, of which the following is a specification.

The taps can be removed more easily by simply turning the wheel backward, and forward to turn on again.

The invention consists in the arrangement of two curved arms in connection with a screw-rod passing through the ends of the arms. On one end of said rod, which is screw-threaded, is attached a crank which has a female thread cut in it. By turning the crank the arms will close up, and will cause the other end of the arms to spread, jaws being on that end that passes into the carriage-hub. The wheel then can be taken off and greased, and by turning forward the wheel can be run on again, and the wrench then can be removed and applied on another wheel.

Figure 1:
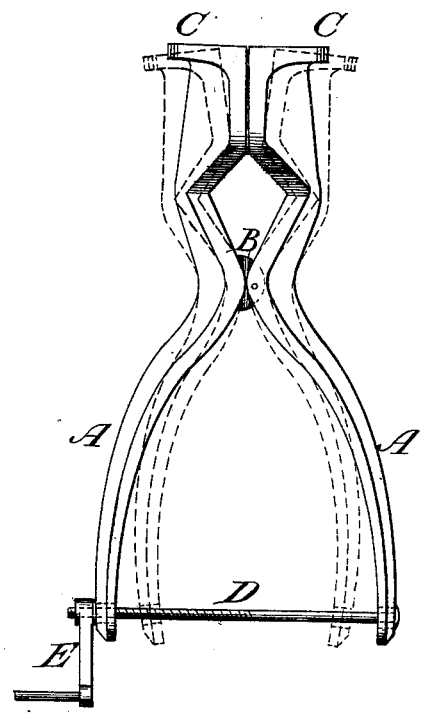
Figure 2:
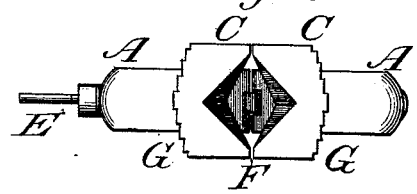

In the accompanying drawings, in which similar letters of reference indicate like parts, Figure 1 is a side elevation of a device embodying my invention. Fig. 2 is an end view.

Letters A A are the curved arms, that are coupled together at letter B, secured by a rivet passing through the coupling. The arms are closed by means of the crank E revolving on the threaded rod D. By turning the crank the arms close and the jaws on the opposite end will be spread and firmly fastened in the hub of the carriage.

Fig. 2, letter G, shows the notched outer surfaces of the jaws that will catch inside of the hub. In connection with the triangular hole in the end of the jaws (shown in drawing referred to by F) the jaws cannot spread enough to let the tap turn around in the end of the wrench, from the fact that the hub-band will prevent the jaws from spreading, so the tap must turn.

What I claim is—

The combination of the arms A A, hinged at B, and provided with the adjusting device D E, with the jaws C C, provided with sockets for the nut, and with curved exterior jaws G, substantially as described, and for the purposes set forth.

HENRY C. MILLER.

Witnesses:
F. H. MOSHER,
CONRAD DECHERT.